C. A. HALBACH.
AUTOMATIC LOCKING DEVICE FOR SASH WINDOWS.
APPLICATION FILED JUNE 22, 1910.

987,675.

Patented Mar. 21, 1911.

Witnesses:
Chas. J. Wright
Otto König

Inventor:
Carl August Halbach

UNITED STATES PATENT OFFICE.

CARL AUGUST HALBACH, OF RONSDORF, GERMANY.

AUTOMATIC LOCKING DEVICE FOR SASH-WINDOWS.

987,675.  Specification of Letters Patent.  Patented Mar. 21, 1911.

Application filed June 22, 1910. Serial No. 568,346.

*To all whom it may concern:*

Be it known that I, CARL AUGUST HALBACH, a subject of the King of Prussia, German Emperor, resident of Ronsdorf, Germany, have invented certain new and useful Improvements in Automatic Locking Devices for Sash-Windows, of which the following is a specification.

This invention relates to a sash-window which is constructed so that it can be stopped at any height by means of toothed wheels meshing with racks, which are mounted in the frame. The window according to this invention does not require special manipulations, the toothed wheels being guided in grooves of the frame so that when the window is being let down, said toothed wheels brake the window and stop it by striking against a pawl on the window.

In the accompanying drawing the improved window for railway compartments is shown by way of example.

Figure 1:
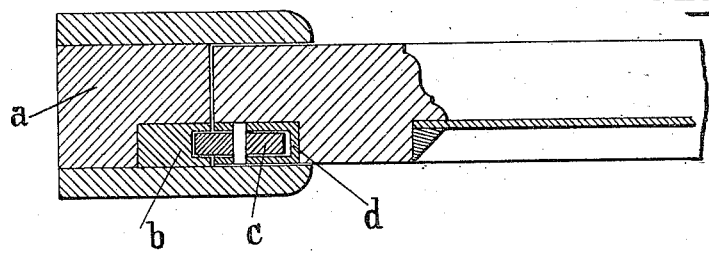
Figure 2:
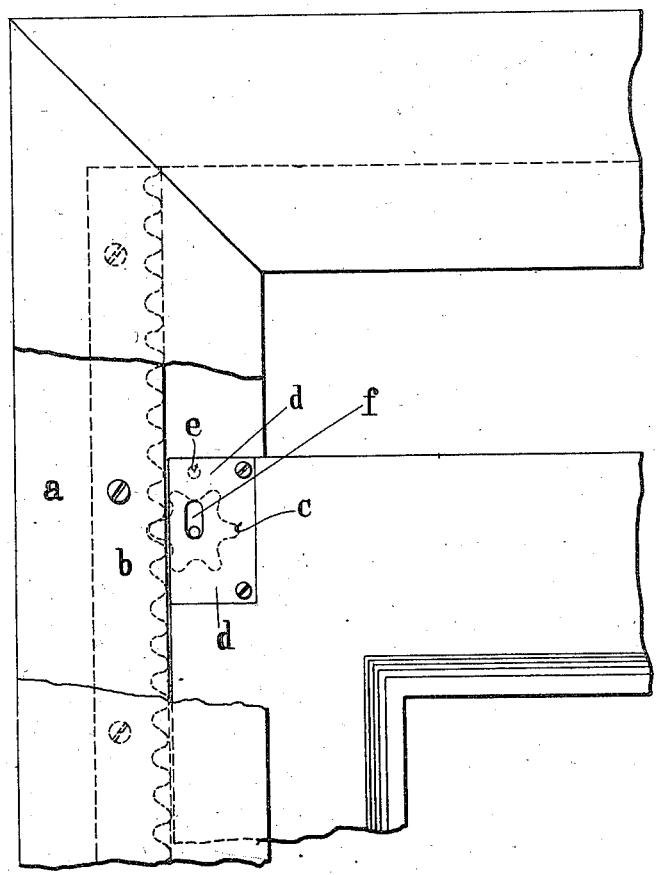

Figure 1 is a cross section showing one side frame of the window at the place where the toothed wheel is situated. Fig. 2 represents in front elevation the upper left hand side corner of the window and of the window frame partly in section.

The improved window for railway compartments is constructed as follows:—At either side of the window a guide bar $a$ is provided to which the rack $b$ is fixed. The toothed wheel $c$ located in the window frame meshes with said rack $b$. The toothed wheel $c$ has an axle which is mounted with its ends in vertical slots $f$ of the casing $d$ fixed in the window frame. Said axle therefore can revolve and simultaneously move in vertical direction. The stop pin $e$ is fixed in the casing $d$ above the toothed wheel $c$.

The device operates as follows:—When the window is being lifted the toothed wheel lies upon the bottom of the casing, its axle being supported by the ends of the vertical slots $f$. Said toothed wheel revolves with the window when the same is being lifted; if the window has been raised to the desired height it is released so that it drops. The toothed wheel is braked by the rack and consequently its axle moves upward in the slots $f$ until the stop pin $e$ penetrating between two teeth of said wheel, locks the same in its position, the window being locked also. In certain cases it would be sufficient to mount the device at one side of the window only.

I claim:—

An improved device for stopping and locking sash-windows in any desired position, comprising in combination with the window, a casing in its side frame having two vertical slots, one at either side, a toothed wheel in said casing, the axle of said toothed wheel located in said vertical slots, a stop pin in said casing above said wheel, and a rack in the sash-frame with which said toothed wheel meshes, substantially as described and shown and for the purpose set forth.

In witness whereof I have hereunto set my hand in the presence of two witnesses.

CARL AUGUST HALBACH. [L. S.]

Witnesses:
 CHAS. J. WRIGHT,
 OTTO KÖNIG.